(No Model.)

A. T. LINDERMAN.
CRATE.

No. 396,165. Patented Jan. 15, 1889.

Witnesses:
Frank B. Blanchard
Fayette J. Partridge

Inventor:
Albert T. Linderman

UNITED STATES PATENT OFFICE.

ALBERT T. LINDERMAN, OF WHITEHALL, MICHIGAN.

CRATE.

SPECIFICATION forming part of Letters Patent No. 396,165, dated January 15, 1889.

Application filed May 13, 1887. Serial No. 238,092. (No model.)

*To all whom it may concern:*

Be it known that I, ALBERT T. LINDERMAN, a citizen of the United States, residing at Whitehall, in the county of Muskegon and the State of Michigan, have invented certain new and useful Improvements in Crates for Protecting Boxes or Packages during Shipment; and I do hereby declare that the following is a full, clear, and exact description of the invention, which will enable others skilled in the art to which it appertains to make and use the same.

Heretofore in the shipment of pasteboard and other light packages by express, freight, or mail difficulty has been experienced in preventing the collapsing of the box or package by rough usage, or by the weight of other packages piled upon it.

The objects of my invention are to provide a strong cheap crate that can be easily and quickly applied around the outside of a box or boxes or other packages, and which can be closely nested for reshipment. I attain these objects by making a crate in the manner illustrated in the accompanying drawings, in which—

Figure 1:
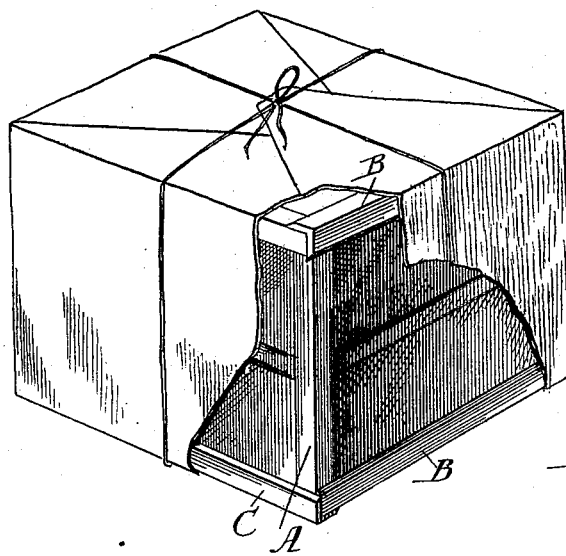
Figure 2:
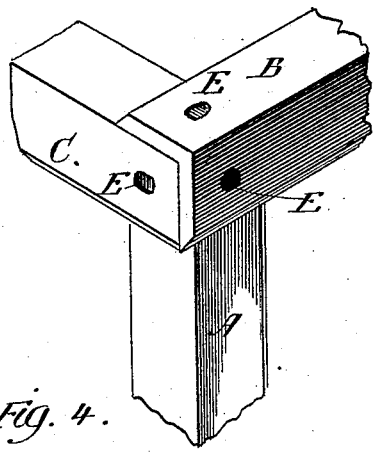
Figure 4:
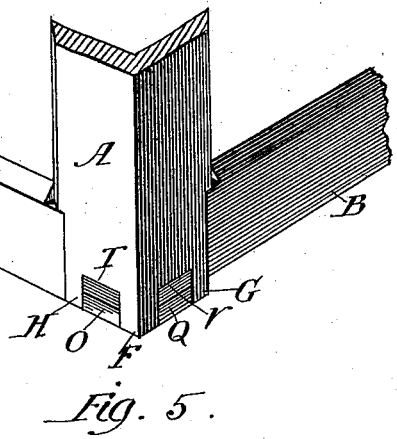
Figure 3:
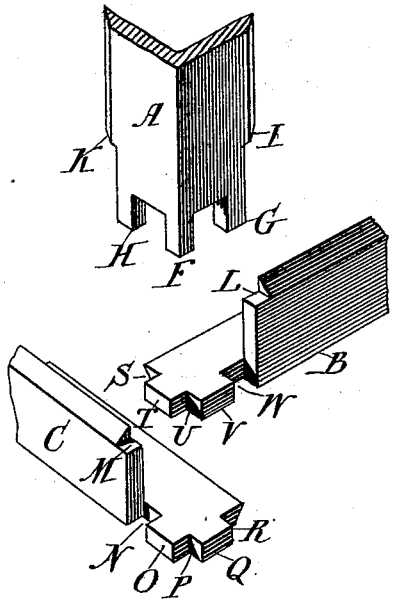
Figure 5:
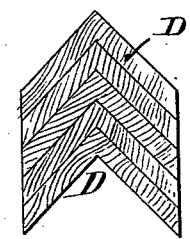

Figure 1 is a view in perspective of a package of two boxes inclosed in my improved crate, the paper inclosing the boxes and crate being shown as broken away at two corners and along five edges of the package the better to show the crate; Fig. 2, a view in perspective of a corner of my improved crate where tacks are used to fasten the crating together; Fig. 3, a view in perspective showing the manner in which I cut the three ends of separate pieces of my improved crating in order to form a lock-corner; Fig. 4, a view in perspective of the three pieces cut as shown in Fig. 3, when the lock is made by uniting them together; Fig. 5, an end view of several pieces of my improved crating, showing the manner in which they are nested for shipment in the knockdown, also clearly illustrating the way in which I cut them from lumber with but little waste.

Similar letters refer to like parts throughout the several views.

The material for my improved crate can be cut with a circular saw or gang of saws set at right angles to the side of the lumber and arranged to cut into the lumber as far as the angle of the crating to be made extends. In the style of crating shown in the drawings this would be to the center of the board. A similar saw or saws can be operated at the same time upon the other side of the board a little forward or back of the first saw or saws, so that the saw-teeth of one set would not strike the teeth of the other set, and the crating would be cut at one passage through the saws; or a single saw or gang of saws can be used, and the lumber cut partly through laterally and then turned and passed through again, completing the cutting of the crating. Lumber of different kinds and thickness can be used, and the thickness of the crating can be varied by spacing the cut of the saw or saws apart, according as the strength of the crate demands.

Where the crating D is used without any fastening at the corners, it is simply placed about the box or package over all its exterior edges, as shown in Fig. 1, and the package tied up either with or without paper covering; or, as shown in Fig. 2, it can be fastened at the corner with tacks, E, screws, wire, or other metal fastenings. Where it is used with the lock-corner, the standard or upright piece A is cut out, leaving three tenons, F G H, upon the end. The side piece, B, is cut to fit these three tenons on the upright A, the end piece, C, being also cut to fit the upright A. When laid at right angles to the side B, this feature, as well as the angle of the upright crating A when cut from the lumber, can be varied to fit about octagonal or other angular shapes, should occasion require, and yet be within the scope of my invention.

I prefer to cut shoulders I K upon the upright A, and a corresponding shoulder, L M, upon the side B and end piece, C, so that both angles of the side B and end C can have a bearing upon the upright A.

The tenon F can be cut off the upright A, and corresponding notches, P and U, left off the end C and side B, and thus add slightly to the strength of the tenons O and V by increasing the length of their bearing; but as their strength proves adequate when cut in the manner shown, and as the cutting out the tenon F requires an additional handling in cutting, I prefer to form the joint in the manner shown.

I am aware that prior to my invention angle-wood has been made for eaves-spouts, and I do not claim angle-wood, broadly, as my invention; but I do not know, nor do I believe, that prior to my invention angle-wood has been known or used in combination with and upon the outside edges of a box or boxes or packages for the purposes of a knockdown crate.

What I claim as my invention, and desire to secure by Letters Patent, is—

1. In combination with a rectangular package, right-angled protectors arranged upon all of the edges of the package and a means for holding them in place, as and for the purpose stated.

2. In combination with a box, boxes, or packages, the pieces of right-angular angle-wood, A B C, applied on the outside of the corners, and means for holding them in place, substantially as described.

3. In combination with a box, boxes, or packages, the pieces of angle-wood, A B C, applied on the outside of the corners, one of these pieces being tenoned and the other two pieces being mortised to fit this tenon to form a lock-corner, as described.

ALBERT T. LINDERMAN.

Witnesses:
FELIX J. GRIFFEN,
HENRY F. VALLETTE.